United States Patent [19]

Ohkubo et al.

[11] Patent Number: 5,272,579
[45] Date of Patent: Dec. 21, 1993

[54] MECHANISM FOR LOADING TAPE CARTRIDGE INTO TAPE DRIVING APPARATUS

[75] Inventors: Hiroshi Ohkubo, Fussa; Takashi Miyamoto, Tokyo, both of Japan

[73] Assignee: Teac Corporation, Japan

[21] Appl. No.: 863,366

[22] Filed: Apr. 1, 1992

Related U.S. Application Data

[63] Continuation of Ser. No. 432,127, Nov. 3, 1989, abandoned.

[30] Foreign Application Priority Data

Nov. 8, 1988 [JP] Japan .............................. 63-145844[U]
Oct. 27, 1989 [JP] Japan .............................. 1-126320[U]

[51] Int. Cl.$^5$ ............................................. G11B 5/008
[52] U.S. Cl. ................................... 360/96.5; 360/96.4
[58] Field of Search .......................... 360/93, 96.1, 96.4, 360/96.5, 96.6, 130.2, 130.3, 130.31, 130.32

[56] References Cited

U.S. PATENT DOCUMENTS

| | | | |
|---|---|---|---|
| 4,622,606 | 11/1986 | Rudi | 360/96.5 |
| 4,636,890 | 1/1987 | Rudi et al. | 360/96.5 |
| 4,677,508 | 6/1987 | Barton, Jr. et al. | 360/96.5 |
| 4,745,499 | 5/1988 | Yoshikawa | 360/96.5 X |
| 5,038,235 | 8/1991 | Ohzawa et al. | 360/96.5 X |

FOREIGN PATENT DOCUMENTS

14976 4/1977 Japan .

*Primary Examiner*—Andrew L. Sniezek
*Attorney, Agent, or Firm*—Andrus, Sceales, Starke & Sawall

[57] ABSTRACT

An apparatus for driving an information recording tape housed in a cartridge having a case accommodating a pair of spools rotatable around shafts, the information recording tape wound on the both spools, a drive roller, a rotation transmission mechanism transmitting the rotation of the drive roller to the pair of the spools comprises a cartridge holding mechanism holding the cartridge, a drive motor having a stator and a rotor, the rotor being arranged outside of the stator and covering the stator, the drive motor having a roller member formed of an elastic material provided on an outer circumferential surface of the rotor, and a pressing mechanism pressing the roller member of the drive motor against the drive roller in the cartridge.

3 Claims, 9 Drawing Sheets

MECHANISM FOR LOADING TAPE CARTRIDGE INTO TAPE DRIVING APPARATUS

The present application is a continuation of U.S. patent application Ser. No. 07/432,127, filed Nov. 3, 1989, and now abandoned.

BACKGROUND OF THE INVENTION

The present invention relates to a tape drive device suited to an apparatus such as a tape recorder or data recorder that performs information read/write with respect to an information storage tape (magnetic tape) housed inside a cartridge which is set inside the tape drive device. Further the present invention relates to an apparatus for loading the cartridge into an apparatus for driving an information recording tape. The cartridge has a case, the inside of which is a pair of spools that are freely rotatable around shafts, an information recording tape wound from the end of both spools and in opposite directions, a drive roller that has its rotating surface exposed from a window opening opened in the front surface of the case, and a rotation transmission mechanism to transmit the rotation of the drive roller in the same direction as the pair of spools. The rotation of the drive roller causes the information recording tape on one of the spools to be wound onto the other spool. The cartridge loaded into the apparatus for driving the tape has lock concave parts formed at front lower portion of both sides of the case.

The structure of an existing cartridge of the above construction is indicated more specifically in FIG. 1, FIG. 2, FIG. 3A and FIG. 3B. The cartridge in which this information recording tape is housed is called a data cartridge for example.

Figure 1:
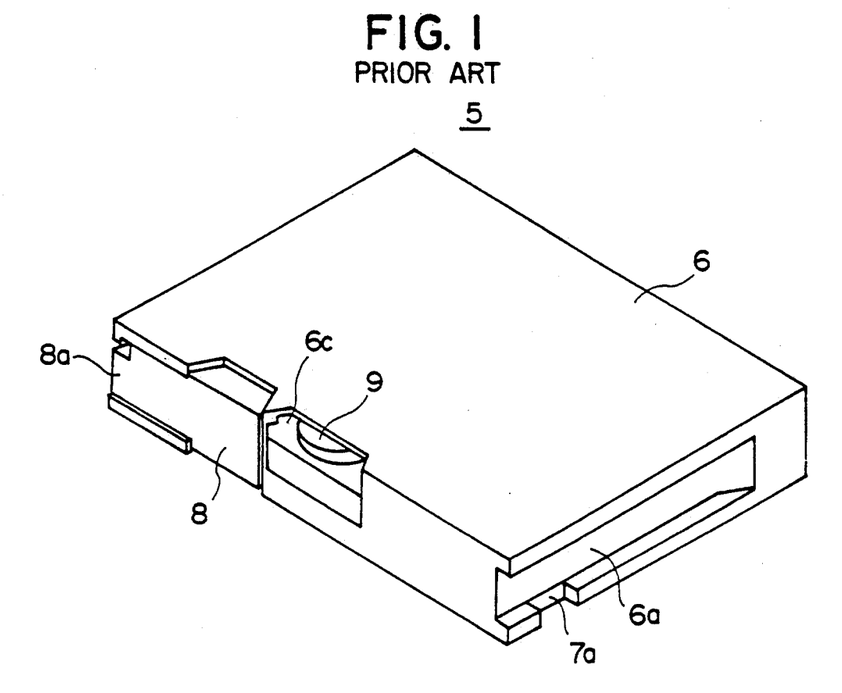
FIG. 1, FIG. 2, FIG. 3A and FIG. 3B are views indicating the structure of a conventional cartridge in which information recording tape is housed.
Figure 2:
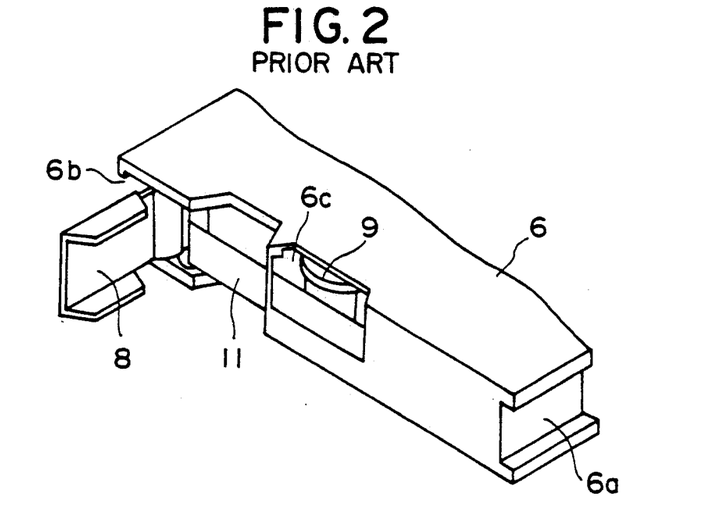

FIG. 1 is a perspective view indicating the outer appearance of a data cartridge 5, and FIG. 2 is a perspective view indicating the outer appearance of the front surface portion of the data cartridge 5. Guide rails 6a and 6b are formed at both ends of a case 6, and a lower wall portion of the front portion of each of the guide rails 6a and 6b is cut out to form lock concave parts 7a and 7b (lock concave part 7b cannot be seen in the figure). The front surface portion of the case 6 has a window opening 6c formed in it and a lid 8 is formed with respect to this window opening 6c. The circumferential surface of a drive roller 9 provided inside the case 6 is exposed from this window opening 6c and the lid 8 is axially supported so as to be arbitrarily rotatable around the front corner of the case 6. The lid 8 is normally in the closed state and prevents the entry of dust and the like into the case 6. The lid 8 rotates around the center of the support shaft when an end portion 8a of the lid 8 is pressed, and the information recording tape (hereinafter, simply termed "tape") inside the case is exposed from the opening when it is released (Refer to FIG. 2).

Figure 3A:
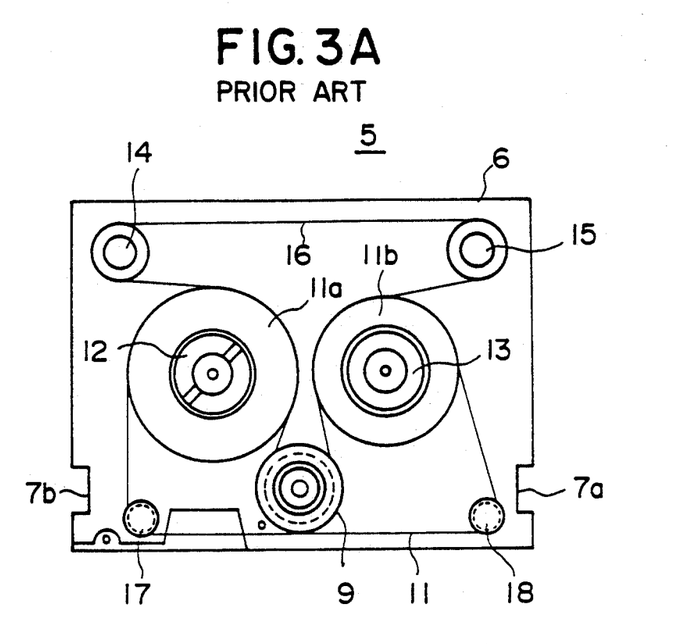
Figure 3B:
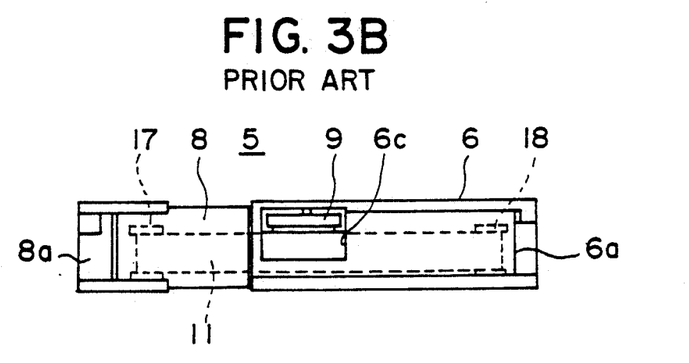

The internal structure of the data cartridge 5 is shown in FIG. 3A and FIG. 3B. Inside the case 6 are provided a pair of spools 12 and 13 supported so as to be arbitrarily rotatable about their shafts, a drive roller 9, and guide rollers 14 and 15. The tape 11 wound around the spool 12 passes the tension rollers 17 and 18 and is wound up by the other spool 13. The drive roller 9 and the guide rollers 14 and 15 engage a drive belt 16 so that the drive belt 16 presses against the surface of the tape wound around the spools 12 and 13. By this, the drive roller 9 rotates and moves the drive belt 16 so that a force is applied to the tape at the portions 11a and 11b in the direction contact with the drive belt 16, and the pair of spools 12 and 13 rotate in the same direction. Then, the rotation of the spools 12 and 13 in the same direction causes the tape to be wound from one of the spools onto the other the spools and when this occurs, the tape is said to be in a tape run status between each of the tension rollers 17 and 18.

In a data cartridge having a structure such as described above, the internal tape 11 is driven by the transmission of a rotational force with respect to the drive roller 9. A conventional type of tape drive apparatus for the transmission of this rotational force to this drive roller is disclosed in Japanese Patent Publication No. 14976/1977 (Japanese Patent Laid Open Application No. 5517/1973), for example. The data drive apparatus according to this disclosure has, the structure which is either such that a rotational force of the motor is transmitted to the drive roller inside the data cartridge via a belt, pulleys and other force transmission parts, or such that a roller mounted on the motor shaft extending from the main motor body (and including the stator and the rotor) and extending in the upwards direction, presses against a drive roller inside the data cartridge.

In a conventional tape drive apparatus as has been described above, many parts are required for the mechanism to transmit the rotational force from the motor to the drive roller inside the cartridge. In those apparatus having a structure where a roller mounted to the rotor shaft of the motor presses against a drive roller inside the cartridge, the roller is mounted to a portion (a rotor portion) projecting further out from the main motor body and so more space is required to accommodate this extra height. For these reasons, a larger number of processes and higher costs are therefore required to assemble equipment such as tape recorders and data recorders into which conventional tape drive apparatus are incorporated, and it is also difficult to make the products compact and in particular, thin.

In a conventional mechanism loading a cartridge into an apparatus for driving an information recording tape, when the cartridge is loaded into the apparatus, a press mechanism engages and presses lock concave parts 7a, 7b formed at front lower portions of sidewalls thereof from under side of the case to thereby hold the case stationary. The structure in which the press mechanism presses the case from under side of it prevents the products from being made compact and in particular thin.

SUMMARY OF THE INVENTION

Accordingly, it is a general object of the present invention to provide a novel and useful apparatus for driving an information tape and to provide a novel and useful mechanism for loading a cartridge into an apparatus for driving an information recording tape, in which the problems described heretofore are eliminated.

Another object of the present invention is to provide an apparatus for driving an information recording tape that enables to make products compact and in particular thin.

The above object can be achieved by a apparatus for driving an information recording tape housed in a cartridge having a case accommodating a pair of spools rotatable around shafts, the information recording tape wound on the both spools, a drive roller rotatable around a shaft parallel to the shafts of the spools, the drive roller having a rotating surface exposed from a window opening formed in front surface of the case, a rotation transmission mechanism transmitting the rotation of the drive roller to the pair of the spools so that the pair of spools rotate in the same direction whereby the drive roller rotation causes the information recording tape on one of the spools to be wound onto the another spools, comprising cartridge holding means for holding the cartridge, a drive motor having a stator and a rotor, the rotor being arranged outside of the stator and covering the stator, the drive motor having a roller member formed of an elastic material provided on an outer circumferential surface of the rotor, and pressing means for moving the drive motor to the window opening of the cartridge held by the cartridge holding means and for pressing the roller member of the drive motor against the drive roller in the cartridge, so that the drive roller rotates with rotation of the roller member of the drive motor.

And another object of the present invention is to provide a mechanism for loading a cartridge into an apparatus for driving an information recording tape that enables to make products compact and inpaticular thin.

The above object can be achieved by a mechanism for loading a cartridge into an apparatus for driving an information recording tape, the cartridge having a case having lock concave parts formed at front lower portions of sidewalls thereof, the case accommodating the information recording tape wound on a pair of spools and a drive roller for rotating the pair of spools in a predetermined direction, the apparatus having a drive source for driving the drive roller, comprising slide means for holding the case of cartridge and sliding the case towards the drive source, cartridge pressing means for pressing a front end of the lock concave part from the sidewalls of the case, when the drive roller slid by slide means reaches to a predetermined position with respect to the drive source, and cartridge fixing means for maintaining the cartridge in a state where the case is pressed by the cartridge pressing means and for fixing the slide means to prevent the slide means from sliding.

DESCRIPTION OF THE PREFERRED EMBODIMENTS

Figure 4:
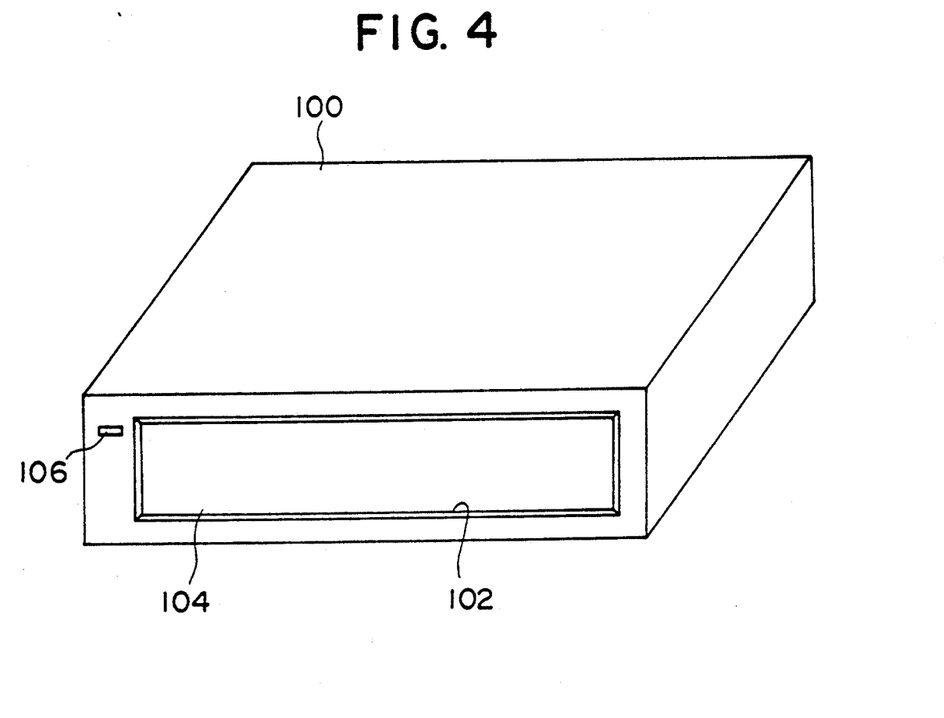
FIG. 4 is a view showing the outer appearance of an apparatus for driving an information recording tape of the present invention.

FIG. 4 is a perspective view indicating the outer appearance of a apparatus for driving an information recording tape of the present invention.

An inserting opening 102 is formed in a front surface of an apparatus 100 for driving a tape accommodated in a cartridge. A lid member 104 is provided so as to cover the insert opening 102. An upper side part of the lid member 104 is hinged on the apparatus 100. Then, when the cartridge is inserted into the inserting opening 102, the lid member 104 is pushed by the cartridge and is made open. When the cartridge is pulled from the inserting opening 102, the lid member 104 is closed.

Figure 5:
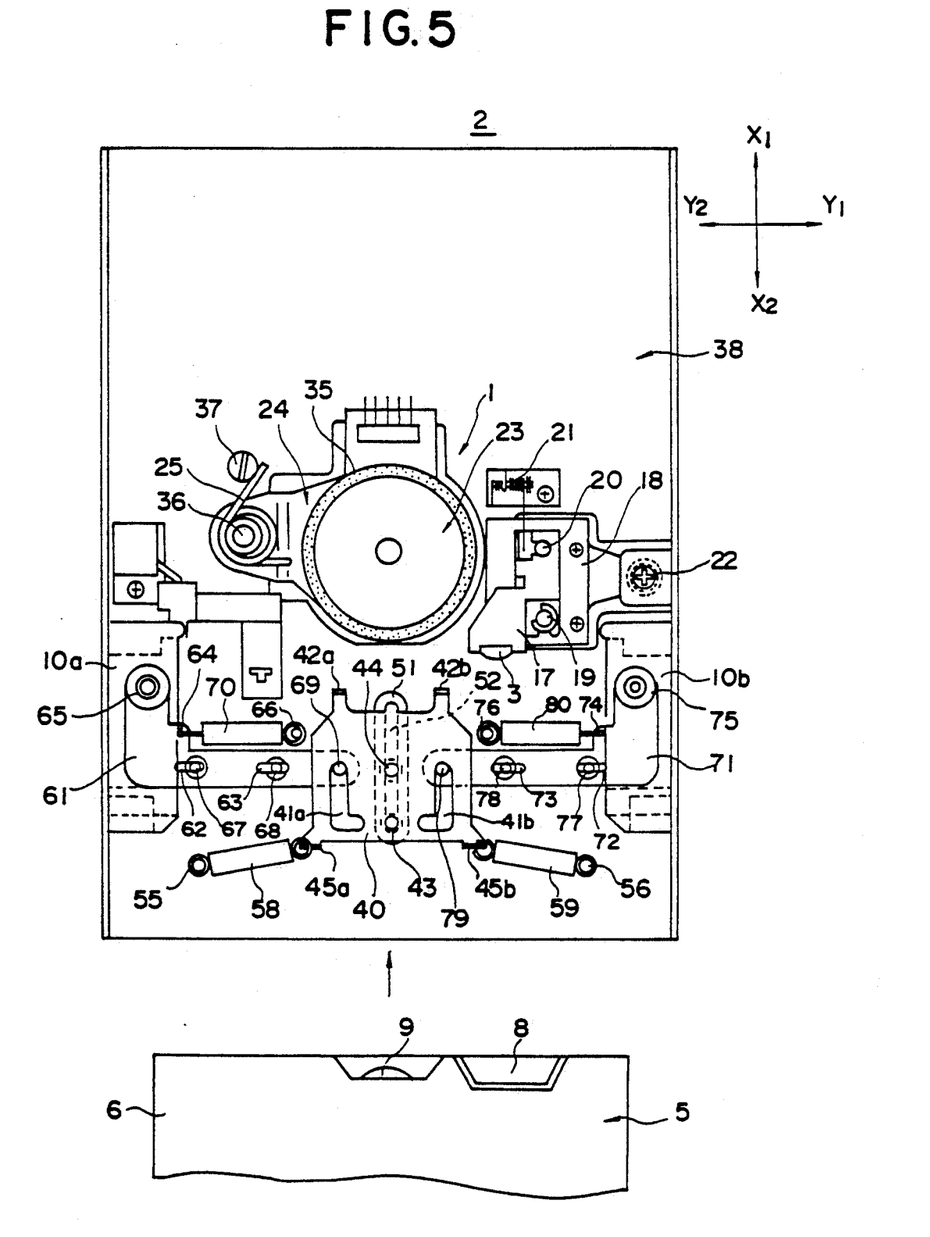
FIG. 5 is a view indicating an embodiment for positioning the tape drive apparatus of the present invention.

FIG. 5 is a view indicating the structure of a tape drive apparatus according to an embodiment of the present invention.

A magnetic head 3 is mounted to a head holder 17. The head holder 17 is mounted so as to be arbitrarily movable in the up-down direction (the vertical direction in the figure) of the shafts 19 and 20 provided upright on the base member 18. The head holder 17 and the base member 18 are urged in the upwards direction and in the downwards direction by the respective urging forces of a spring 21 and a spring 22, so that a magnetic head 3 is stably positioned in the up-down direction.

A tape drive source 1 comprises a motor 23, a base member 24, a torsion spring 25 and other members. The motor 23 is mounted to the base member 24. The base member 24 is mounted so as to be arbitrarily rotatable around a shaft 36 provided upright on a chassis 38. In addition, the torsion spring 25 is mounted to the shaft 36 and one end of the torsion spring 25 is connected to a pin 37 provided upright on the chassis 38, and another end of the torsion spring 25 is fixed to the base member 24. The torsional force of this torsion spring 25 urges the base member 24 to rotate in the clockwise direction about the shaft 36.

Figure 6:
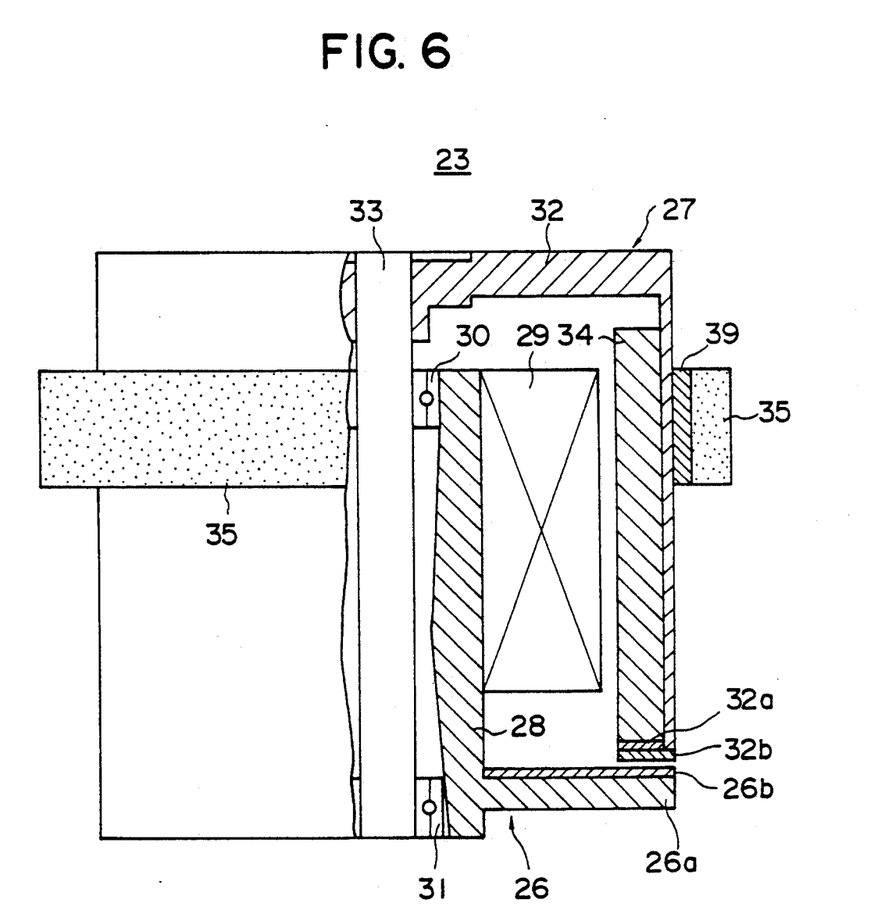
FIG. 6 is a view indicating the structure of the motor.

The structure of the motor 23 is indicated more specifically in FIG. 6.

The motor 23 is basically configured from a stator 26 and a rotor 27. The stator 26 has a cylindrically shaped stator base member 28 and a coil 29. The coil 29 is provided on the outer circumferential surface of the stator base member 28 and bearings 30 and 31 are respectively provided at the top and bottom of the inner side of the stator base member 28. The rotor 27 has a rotor base member 32 covering the stator 26 described above, a shaft 33 supporting the rotor base member 32 and a magnet 34. The rotor base member 32 is cylindrical in shape, hollow, and has one of the ends closed. The stator 26 is disposed inside the hollow center. One end of the shaft 33 is fixed to the center of the closed end portion of the rotor base member 32 and the shaft 33 is supported by bearings 31 and 32 so that the stator 26 is arbitrarily rotatable. A magnet is provided at a position opposing the coil 29 of the stator 26 on the inside of the rotor base member 32, and a circular base plate 39 is provided at a predetermined position on the outer circumferential surface of the rotor base member 32, with a circular roller member 35 formed of an elastic material such as rubber being mounted to the circular base plate 39. Moreover, the lower portion of the stator 26 has a flange 26a formed around the outer circumferential surface of the rotor base member 32, and the upper portion of the flange 26a is provided with a magnetic shield member 26b. In addition, the open ended portion of the rotor base member 32 is provided with a magnetic shield member 26b in contact with the lower end surface of the magnet 34, and a protective member 32a formed of a material such as felt is provided so as to be in contact with the magnetic shield member 26b.

The motor 23 thus has a structure whereby the rotor 27 is disposed on the outside of the stator 26. A motor having a structure such as this is termed an outer motor.

In FIG. 5, a mechanism for loading the data cartridge 5 mounted to the appropriate tape drive apparatus is provided opposite the tape drive source 1. This support mechanism for the data cartridge 5 has the structure described in the following.

A long supporting member 51 is fixed on the chassis 38 opposite the motor 23. This long supporting member 51 is formed with a slide hole 52. A slider 40 is formed on the long supporting member 51. The plate shaped slider 40 is placed on the long supporting member 51 and pins 43 and 44 provided on the underside of the slider 40 engage with the slide hole 52 of the long member 51, so that the slider 40 moves reciprocally along supporting the slide hole 52 of the long supporting member 51. The slider 40 is held between pins 43 and 44 and is formed with L-shaped holes 41a and 41b at the left and right respectively. Stoppers 42a and 42b are formed at the front end of the slider 40 and concave part portions 45a and 45b are formed at the rear end on the left and right respectively. A spring 58 is mounted between the pin 55 uprightly provided on the chassis 38 and the concave part portion 45a of the slider 40 and 45b and in the same manner, a spring 59 is mounted between the pin 56 uprightly provided on the chassis 38 and the concave part portion 45b of the slider 40. The tensile force of these springs 58 and 59 always urge the slider 40 to move in the downwards direction (in the figure, i.e. in the direction X1→X2). L-shaped loaders 61 and 71 are provided on the left and right of the slider 40 and one end portion of each of the L-shaped loaders 61 and 71 is inserted into the underside of the slider 40. These ends of the L-shaped loaders 61 and 71 are provided with upright pins 69 and 79, with pin 69 engaging with hole 41a of the slider 40 and pin 70 engaging with hole 41b of the slider 40. In addition, long holes 62 and 63 are formed in the L-shaped loader 61, and long holes 72 and 73 are formed in the L-shaped loader 71. Upright pins 67 and 68 are provided in the chassis 38 at positions opposite the long holes 62 and 63. Each of the pins 67 and 68 has a structure where a thin portion is on top of a thick portion so that the thin portions engage the long holes 62 and 63 and so that the loader is supported by the thick portions. Upright pins 77 and 78 are provided in the chassis 38 at positions opposite the long holes 72 and 73 of the loader 71 and so as to engage the long holes 72 and 73. The inner side angled portions of the L-shaped loaders 61 and 71 are formed with concave part portions 64 and 74 for the springs. A spring 70 is provided in the space between the pin 66 provided upright on the chassis 38 and the hook portion 64 and in the same manner, a spring 80 is provided in the space between the pin 76 provided upright on the chassis 38 and the hook portion 74. The tensile force of the spring 70 always urges the loader 61 in the direction to the right (Y2→Y1 in the figure) and the tensile force of the spring 80 always urges the loader 71 in the direction to the left (Y1→Y2 in the figure). In addition, the end portions of the L-shaped loaders 61 and 71 are provided with clampers 65 and 75 formed by rubber rollers. Each of the clampers 65 and 75 is of a truncated cone shape.

Both sides of the chassis 38 are provided with guide rails 10a and 10b. These guide rails 10a and 10b serve as a supporting member which slidably supports the cartridge.

In a tape drive apparatus having the structure as described above, the data cartridge 5 is mounted in the tape drive apparatus from the direction indicated by the arrow in FIG. 5.

Figure 7:
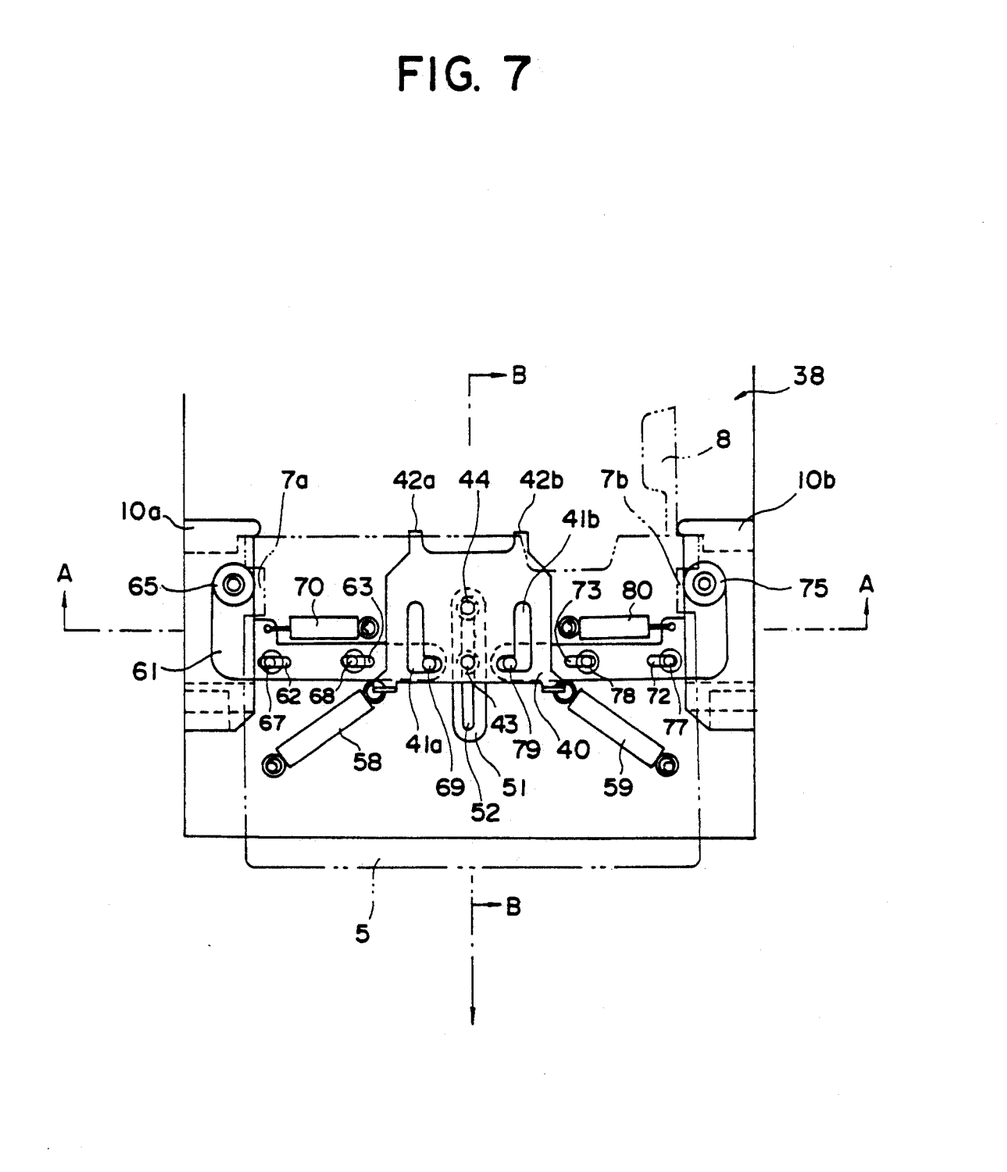
FIGS. 7, 8 and 9 are a view indicating the status of the cartridge hold mechanism when the data cartridge is mounted in the data drive apparatus.
Figure 8:
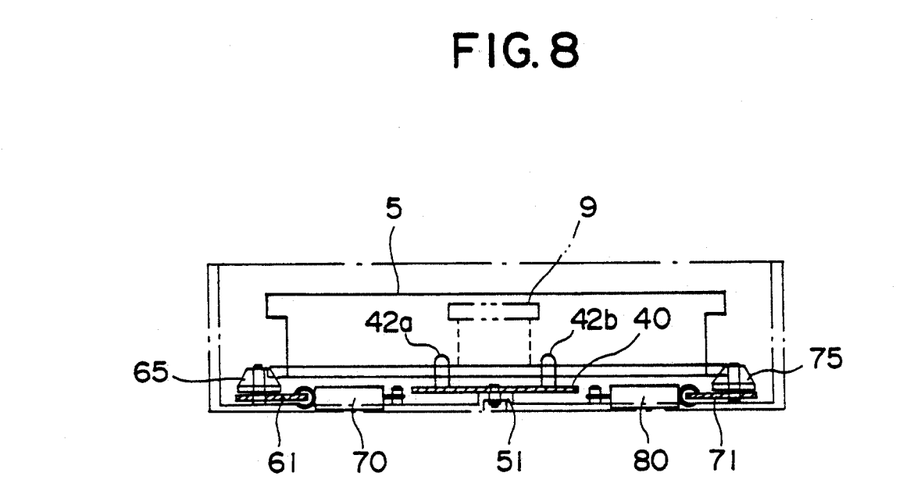
Figure 9:
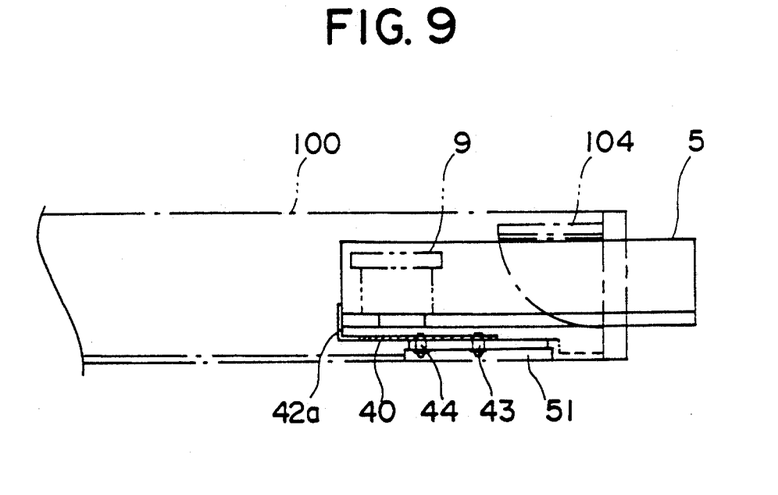

The data cartridge 5 is inserted into the tape drive apparatus and guide grooves 6a and 6b of the data cartridge 5 are guided by the guide rails 10a and 10b. When the data cartridge 5 is moving along the guide rails 10a and 10b, an end portion 8a of a lid 8 provided on the front surface of the data cartridge 5 is pressed by the end portion of guide rail 6a and the lid 8 is rotated so as to open. The data cartridge 5 and the slider 40 move together when the end portion of the case 6 of the data cartridge 5 contacts the stoppers 42a and 42b of the slider 40 and the data cartridge 5 is pushed in further. When the slider 40 is moving, the upright pins 69 and 79 provided in the end portion of the L-shaped loaders 61 and 71 move in the longitudinal direction (X2→X1 in the figure) of the L-shaped holes 41a and 41b. Then, the front side portion of the case 6 moves until the data cartridge 5 reaches the end portion of the guide rails 10a and 10b and when each of the upright pins 69 and 79 reach the angled portions of the L-shaped holes 41a and 41b, the tensile force of each of the springs 70 and 80 causes the pins 69 and 79 to move in the lateral direction (Y1,2→Y1,2 in FIG. 5) of the L-shaped holes 41a and 41b and move the L-shaped loaders 61 and 71 to the inner side. As a result, as is indicated in FIG. 7, FIG. 8, FIG. 9, the clampers 65 and 75 provided on the other ends of the L-shaped loaders 61 and 71 contact the front side angle of lock indentations 7a and 7b formed on the lower side of the front end of the data cartridge 5. Then, the tensile force of the springs 70 and 80 holds the data cartridge 5 from the left and the right sides and pushes the data cartridge 5 to the end portion of the guide rails 10a and 10b. In addition, the upright pins 69 and 79 of the L-shaped holes 41a and 41b of the slider 40 and so the slider 40 cannot move in the up-down direction (i.e. it is in the locked status). Therefore, the position of the data cartridge 5 is fixed.

FIG. 8 is a cross sectional view taken along line A—A shown in FIG. 7. FIG. 9 is a cross sectional view taken along line B—B shown in FIG. 7.

Figure 10A:
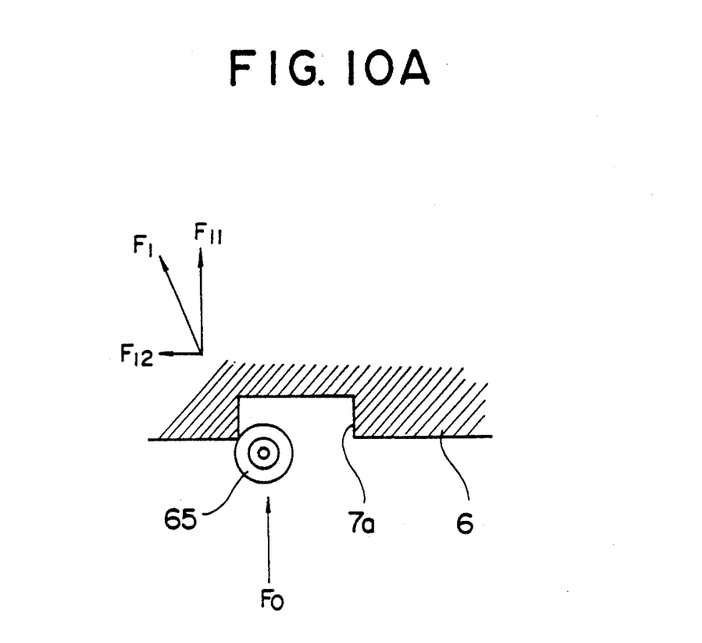
FIG. 10A and FIG. 10B are views indicating a distribution of forces in a state where the cartridge is fixed.
Figure 10B:
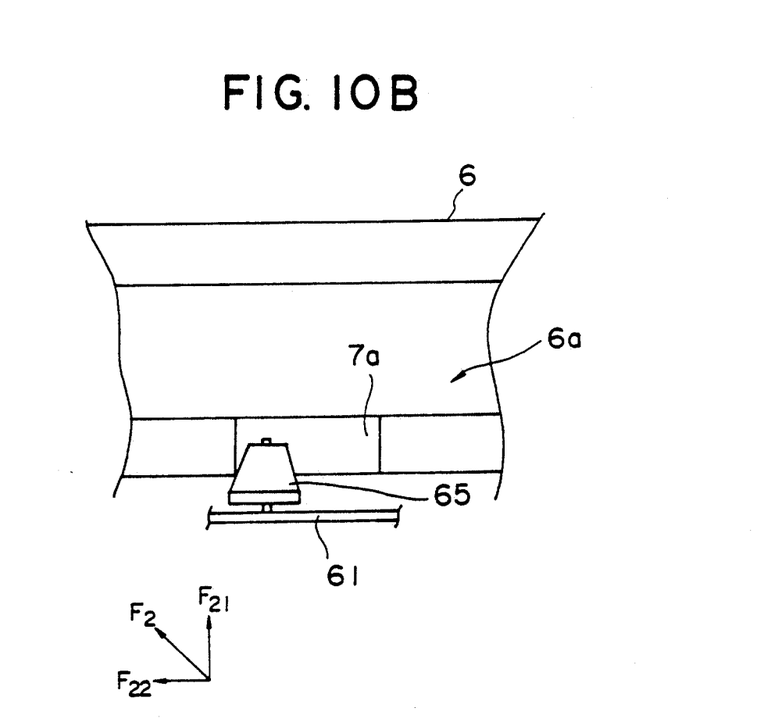

FIG. 10A is a cross sectional view of a part of the case 6 in the vicinity of clamper 65. FIG. 10B is a side view of a part of the case 6 in the vicinity of clamper 65. A force F0 provided by the spring 70 is exerted on clamper 65. The clamper 65 is in contact with a front corner of the lock concave part 7a and presses the case 6 with a force F1 (Refer to FIG. 10A). A transverse component F11 of the force F1 is a force with which the cartridge 5 is pressed in the transverse direction. A longitudinal component F12 of the force F1 is a force with which the cartridge 5 is pressed in the longitudinal direction. Because the clamper 65 is of truncated cone shape, a force F2 is exerted on the case 6 in an upward slant direction. An upward component F21 of the force F2 is a force with which the cartridge 5 is pressed in the upward direction. A forward component F22 of the force F2 is a force with which the cartridge is pressed in the front direction. This type of the cartridge is pressed in the upward and forward directions, so that the cartridge is fixed. Because the clamper 65 is of truncated cone shape, even if the force F0 is exerted on the clamper 65 in a side direction, forces exerted on the cartridge 5 through the clamper 65 are the forward force (F12, F22) and the upward force (F21).

The clamper 75 presses the cartridge in the same manner as the clamper 65.

Moreover, when the data cartridge 5 is ejected, pulling the data cartridge 5 in the direction indicated by the arrow in FIG. 7 causes the clampers 65 and 75 of each of the L-shaped loaders 61 and 71 to ride over the surface of the front side portion of the case 6 and cause the pins 69 and 79 at the other end of the L-shaped loaders 61 and 71 to slip into the longitudinal portion of the L-shaped holes 41a and 41b. By doing this, the lock of the slider 40 is cancelled, and the tensile force of the spring 58 and the spring 59 moves the slider 40 in the downwards direction (the direction indicated by the arrow in FIG. 7) so that the data cartridge 5 can be taken out.

In the mechanism for loading a data cartridge into the apparatus described above, a cartridge fixing mechanism is constructed by the L-shape holes 41a, 41b formed in the slider 40, the pins 69, 79 provided on the end part of the loader 61, 71, and the springs 70, 80 (which are also elements of the cartridge pressing means).

Figure 11:
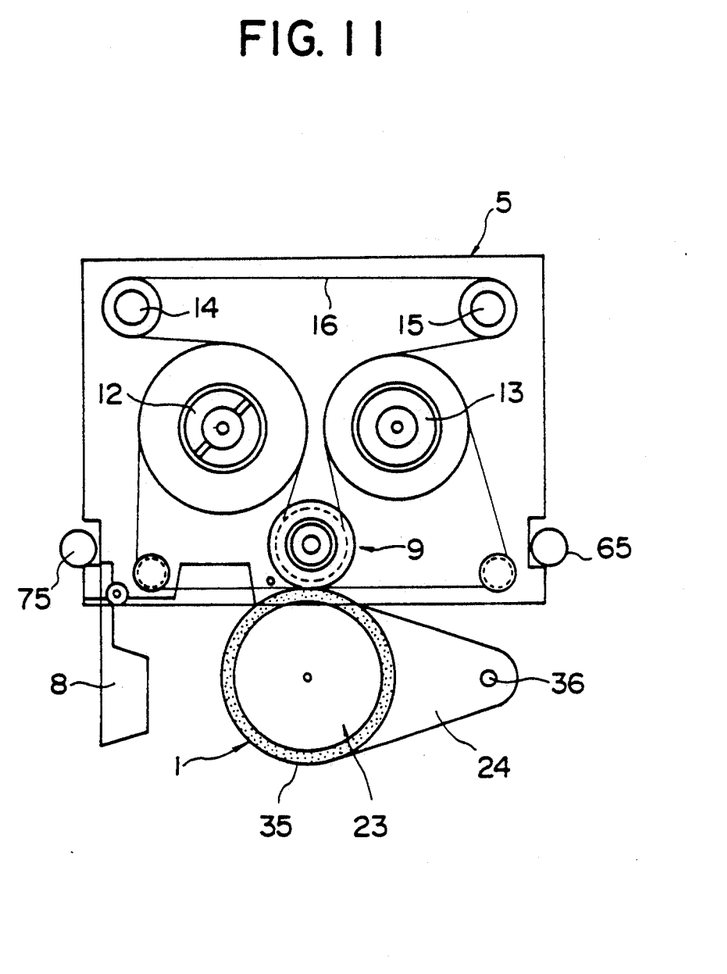
FIG. 11 is a diagram indicating the relationship between the data cartridge and the data drive source when the data cartridge is mounted inside the data drive apparatus.

When the position of the data cartridge is fixed as has been described above, the relationship of the positions of the data cartridge 5 and the tape drive source 1 is as shown in FIG. 11.

The base member 24 to which the motor 23 is mounted is urged by the torsional force of the torsion spring 25 to rotate around the shaft 36. By this, the roller member 35 provided around the circumference of the rotor of the motor 23 pushes with an adequate force against the a drive roller 9 that is exposed from a window opening of the data cartridge 5. In this status, when power is applied to the motor 23 and the rotor rotates, that rotation is transferred from the roller member 35 to the drive roller 9. Then, the rotation of the drive roller 9 winds the tape 11 of the data cartridge 5 from a spool 12 (or 13) onto another spool 13 (or 12) as in conventional apparatus, and the tape 11 is in the tape run status between tension rollers 17 and 18. When the tape 11 is in this tape run status, a head 3 performs read and write of data from and to the tape 11.

Because of the configuration whereby the roller member 35 provided on the outer circumference of the rotor of the motor 23 pressed by the drive roller 9, there is little variation in the torque transmitted from the side of the motor 23 to the drive roller 9 and a stable tape run status is achieved for the tape 11.

In addition, the drive roller 9 inside the data cartridge 5 is directly driven by the motor 23, the number of parts required for the rotation transmission portion can be greatly reduced. Moreover, the motor 23 is of the so-called outer rotor type and so the height of the tape drive source 1 is relatively low, thereby enabling a tape drive apparatus which is comparatively thinner than a conventional tape drive apparatus.

Still moreover, the head transmitted from the rotor 27 in an outer rotor type of motor having the structure as indicated in FIG. 6, is transmitted via the roller member 35 of a flexible material such as rubber, to the drive roller 9 of the data cartridge 5. Accordingly, there is no direct heat transmission with respect to he data cartridge 5, and there is therefore very little influence of heat with respect to the data cartridge 5.

The present invention is not limited to the aforementioned embodiments, and variations and modifications may be made without departing from the scope of the invention.

What is claimed is:

1. A mechanism for loading a cartridge into an apparatus for driving an information recording tape, said cartridge having a case accommodating said information recording tape wound on a pair of spools and having a drive roller for rotating said pair of spools about axes of rotation, said case having a front end substantially perpendicular to a loading direction which is a direction in which said cartridge is loaded into said apparatus, side walls substantially perpendicular to the front end and lying parallel to said axes of rotation of said spools, and top and bottom walls lying perpendicular to said axes of rotation of said spools, each of the side walls having a generally rectangular lock recess formed in a surface thereof having edges lying parallel to the axes of rotation with corners at said bottom wall, a forward one of said edges being closer to said front end of said cartridge than a rear edge, said apparatus having a drive source for driving said drive roller in said case of said cartridge which is loaded in said apparatus, said mechanism comprising:

supporting means for slidably supporting said case of said cartridge when said cartridge is loaded towards said drive source in said apparatus; and cartridge pressing means for pressing said case of said cartridge when said cartridge, loaded toward said drive source in said apparatus, reaches a predetermined position with respect to said drive source, said cartridge pressing means comprising a pair of spaced rollers, one of said rollers being positioned adjacent each of said side walls of said case when said case is loaded toward said drive source, each of said rollers being formed as a truncated cone tapering toward said top wall of said case, said cartridge pressing means having a press mechanism for moving each of said rollers toward the adjacent side wall in a direction substantially perpendicular to said adjacent side wall of said case and parallel to said top and bottom walls of said case so that one of said rollers engages only with said corner of said forward edge of each adjacent side wall recess of said case and for pressing each of said rollers against said corner of each corresponding adjacent side wall of said case so that said case of said cartridge is sandwiched between said rollers and so that each of said rollers exerts a force inwardly, upwardly, and forwardly on said case, thereby to secure the cartridge in the apparatus.

2. A mechanism as claimed in claim 1, wherein said press mechanism comprises a first mechanism for moving each of rollers toward the adjacent side wall in a direction substantially perpendicular to said adjacent side wall of said case and parallel to said top and bottom walls of said case and a second mechanism for fixing said first mechanism in a lock state where a roller presses said corner of each corresponding adjacent side wall when said cartridge, loaded toward the drive source, in said apparatus reaches the predetermined position with respect to said drive source.

3. A mechanism as claimed in claim 2, wherein said second mechanism includes a member having a stopper with which the front end of said case of said cartridge comes in contact, said member being moved in the loading direction by said case when said cartridge is loaded into said apparatus and fixing said first mechanism in the lock state when said cartridge reaches the predetermined position with respect to said drive source.

* * * * *